United States Patent
Reina et al.

[11] Patent Number: 5,498,057
[45] Date of Patent: Mar. 12, 1996

[54] AUTOMATIC VEHICLE LOAD COVER

[76] Inventors: Arthur Reina; Pete Dozier, both of P.O. Box 1104, Ceres, Calif. 95307

[21] Appl. No.: 251,088
[22] Filed: May 31, 1994
[51] Int. Cl.⁶ ........................................................ B60J 5/06
[52] U.S. Cl. .................. 296/100; 160/84.01; 296/146.13
[58] Field of Search ........................ 296/100, 50, 146.13, 296/155, 219; 160/84.1 R, 84.01, 84.1 A, 84.02, 84.1 E, 84.06, 264

[56] References Cited

U.S. PATENT DOCUMENTS

| | | | |
|---|---|---|---|
| 4,652,042 | 3/1987 | Bader | 296/155 X |
| 4,860,813 | 8/1989 | Ballyns et al. | 296/50 X |
| 4,938,273 | 7/1990 | Dubbelman et al. | 160/84.01 X |
| 5,056,847 | 10/1991 | Stillwell et al. | 296/50 |
| 5,080,423 | 1/1992 | Merlot et al. | 160/84.01 X |
| 5,152,575 | 10/1992 | DeMonte et al. | 296/100 X |
| 5,238,283 | 8/1993 | Teigen | 296/155 X |

FOREIGN PATENT DOCUMENTS 4-143122  5/1992  Japan .................... 296/100

*Primary Examiner*—David M. Mitchell
*Assistant Examiner*—Kia M. Robinson
*Attorney, Agent, or Firm*—Howard Cohen

[57] ABSTRACT

An automatic trailer load covering system includes a pair of end assemblies removably secured to opposite ends of the trailer load bed, and a main strut extending between the midpoints of the upper sides of the end assemblies. Each end assembly includes an arch-like channel that supports an end wall, the channels of the end assemblies being oriented in paired, opposed, confronting relationship. At least one pair of tarp covers is provided, each rectangular tarp cover including longitudinally opposed side edges received in one pair of the end channels. Each tarp cover extends from the main strut to the trailer bed, covering one side and one-half width of the top of the trailer load bed. A drive sprocket is supported on the main strut at the upper extent of the channel and an idler sprocket at the lower end of the channel, with a continuous loop of chain extending through the channel. Reinforcing stays extend longitudinally between front and rear edges of the tarp, the ends of the stay secured to a pair of slipper blocks that are slidably received within respective channels to frictionally engage the chain. The ends of the lowermost stay are joined to a pair of connector blocks that are secured in the chain loop. Each drive sprocket is joined to a drive shaft extending parallel to the main strut, and a motor is coupled to the drive shafts. To raise a tarp cover, the two chains at opposite ends of the tarp are driven simultaneously by the same motor to raise the connector blocks toward the main strut. As the horizontal stays reach the upper limit of travel at the main strut, the chain slips through the respective connector blocks to raise the remainder of the tarp cover. The chain drive positively drives the tarp cover to close.

13 Claims, 6 Drawing Sheets

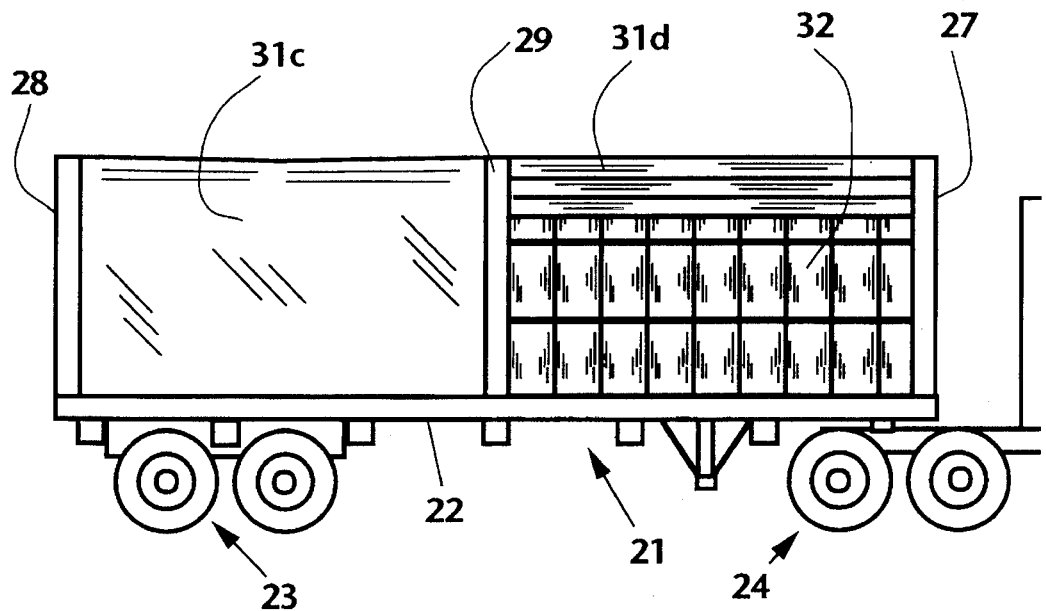
Figure_1
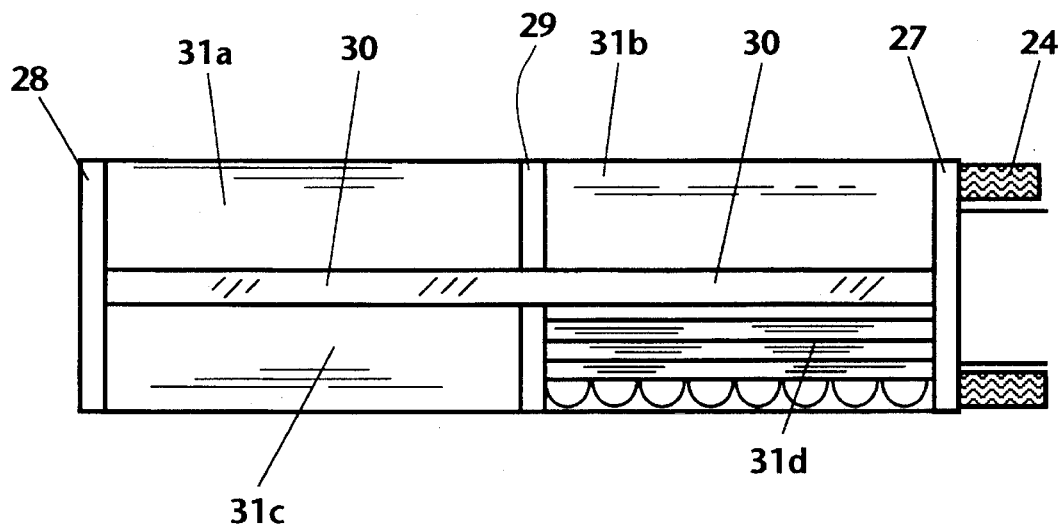
Figure_2

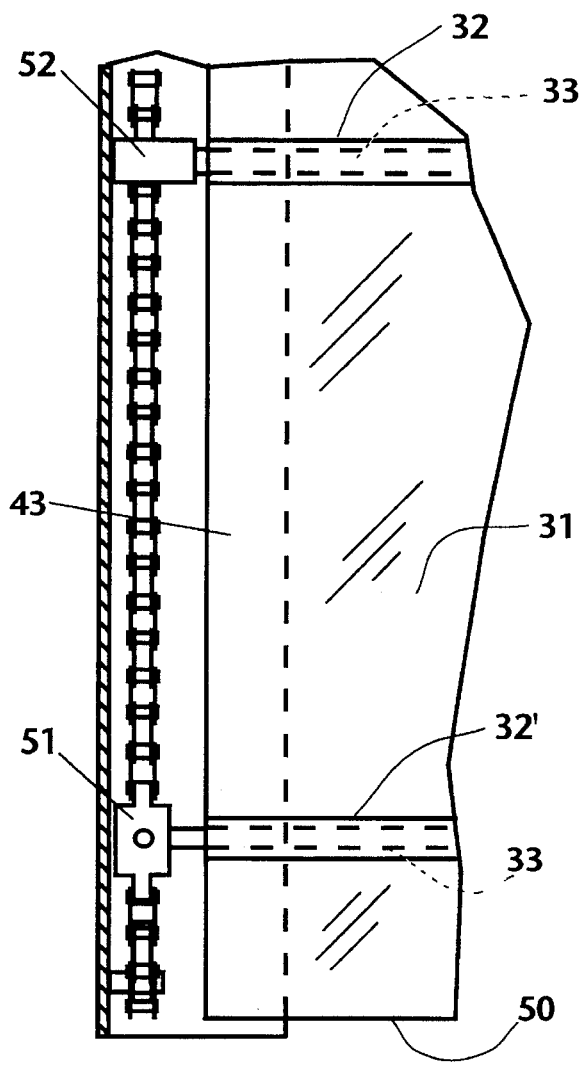
Figure_3
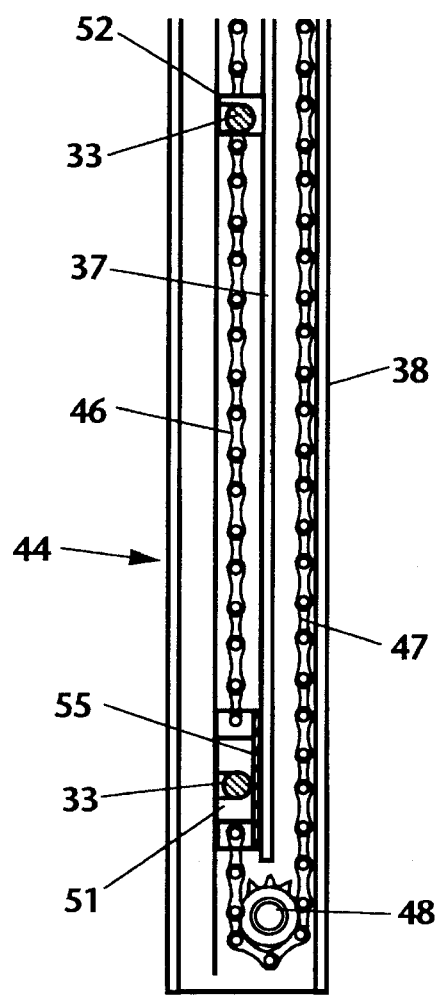
Figure_4
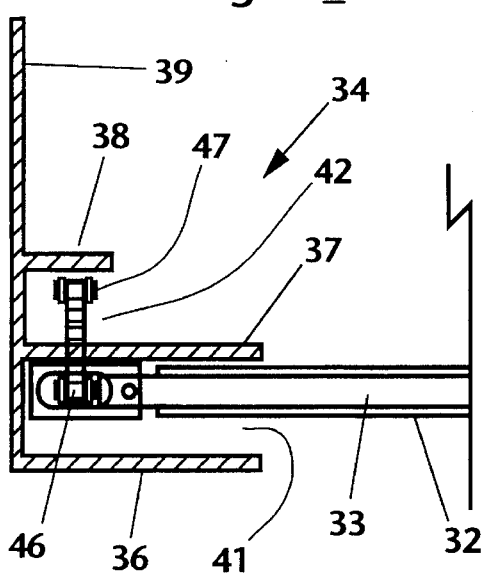
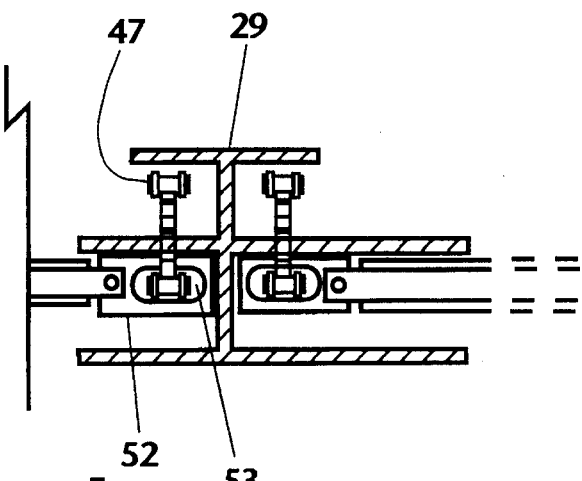
Figure_5

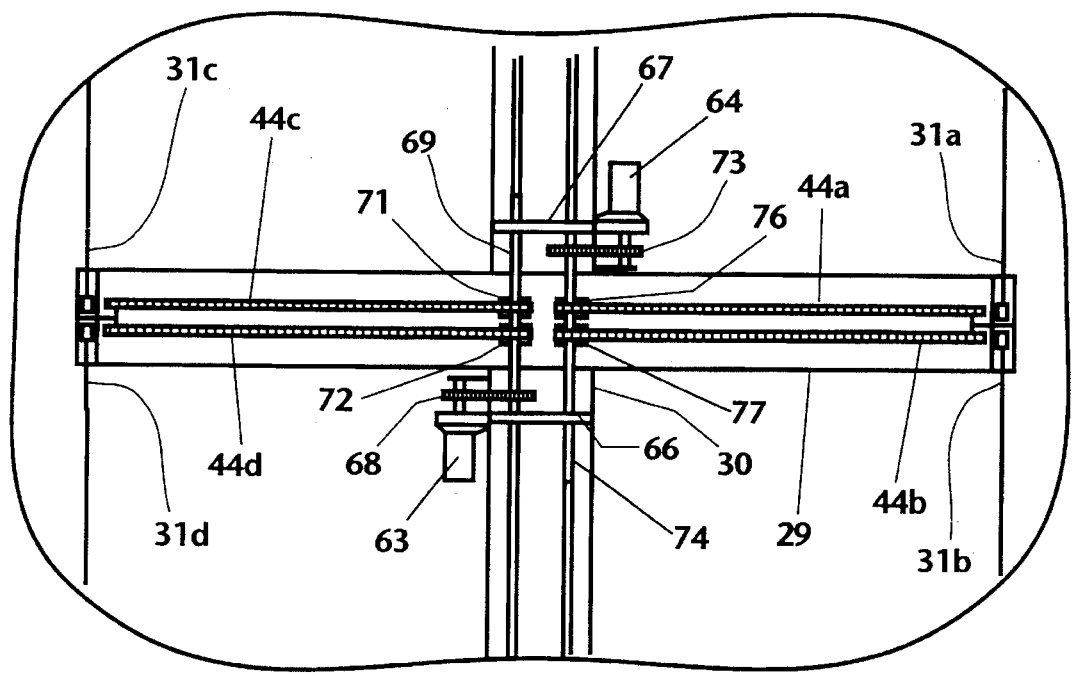
Figure_7
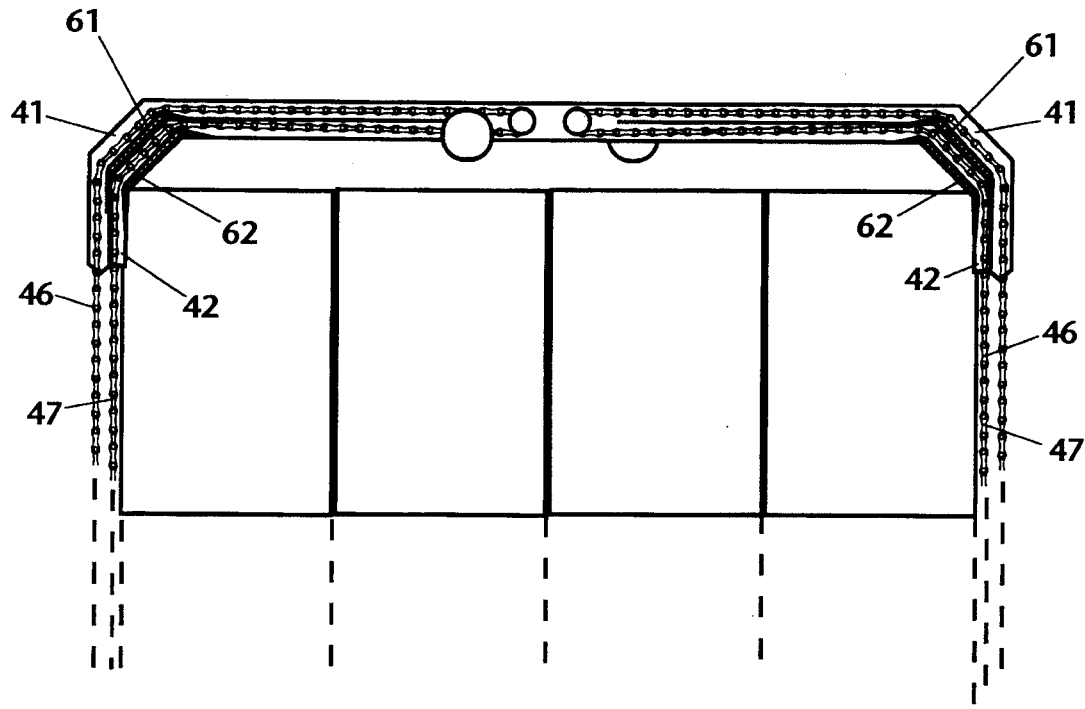
Figure_6

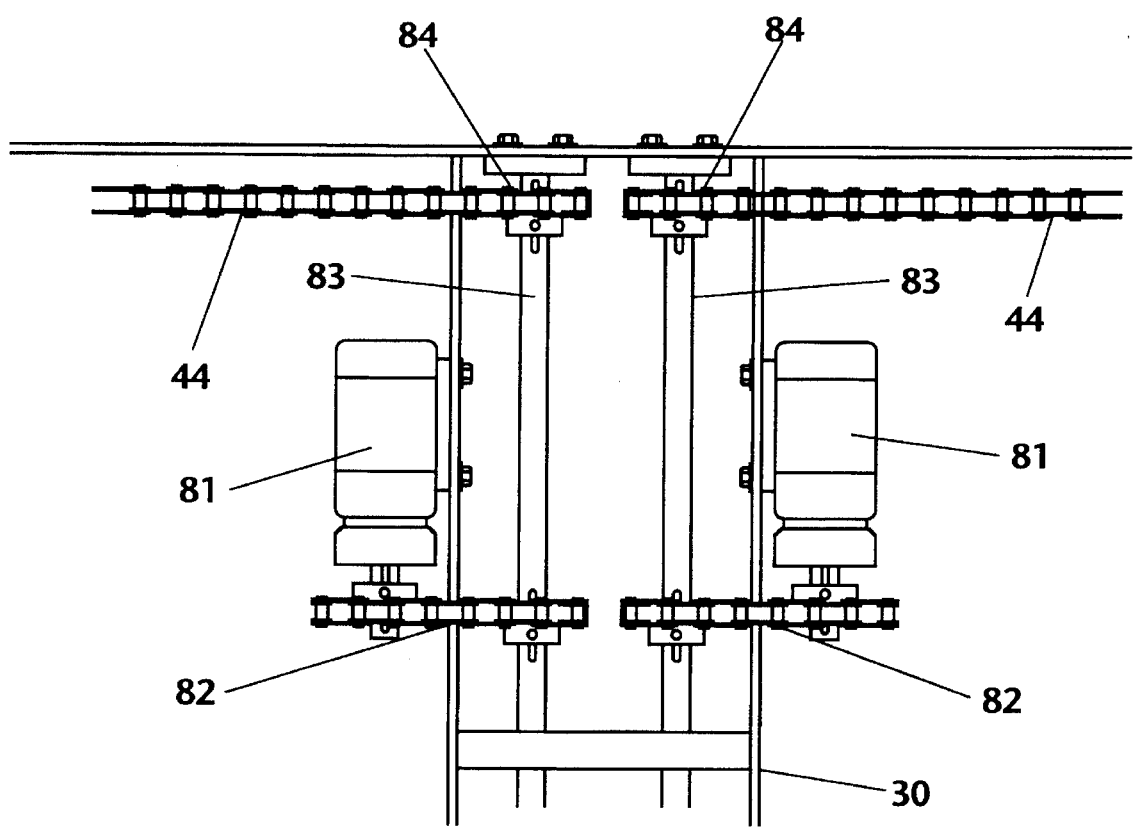
Figure_8
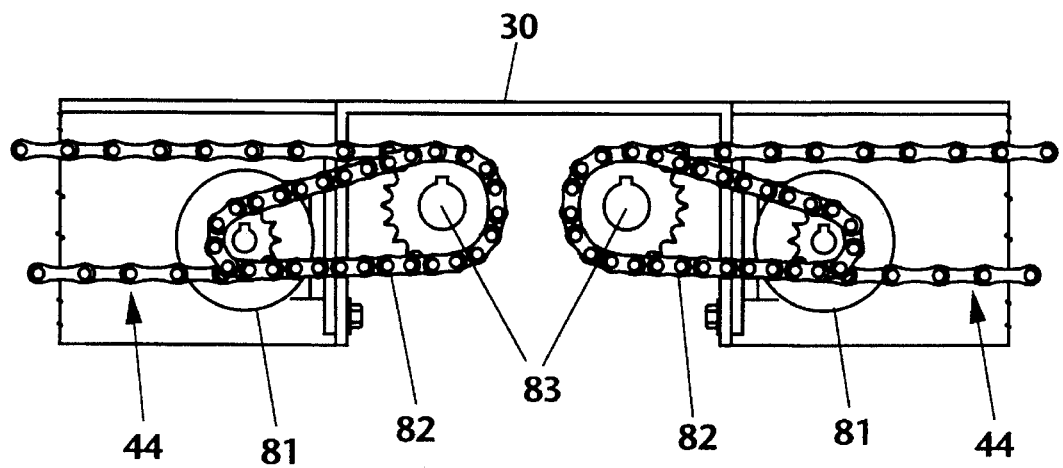
Figure_9

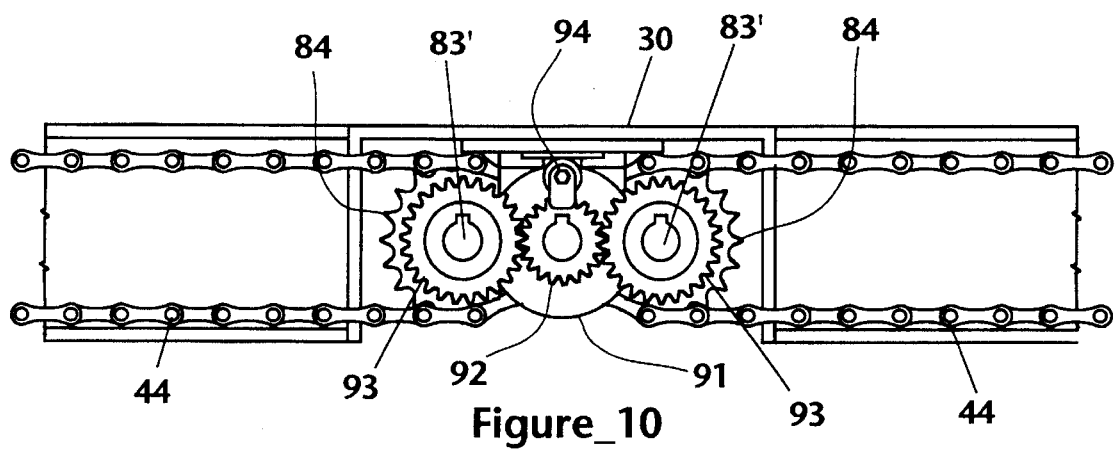
Figure_10
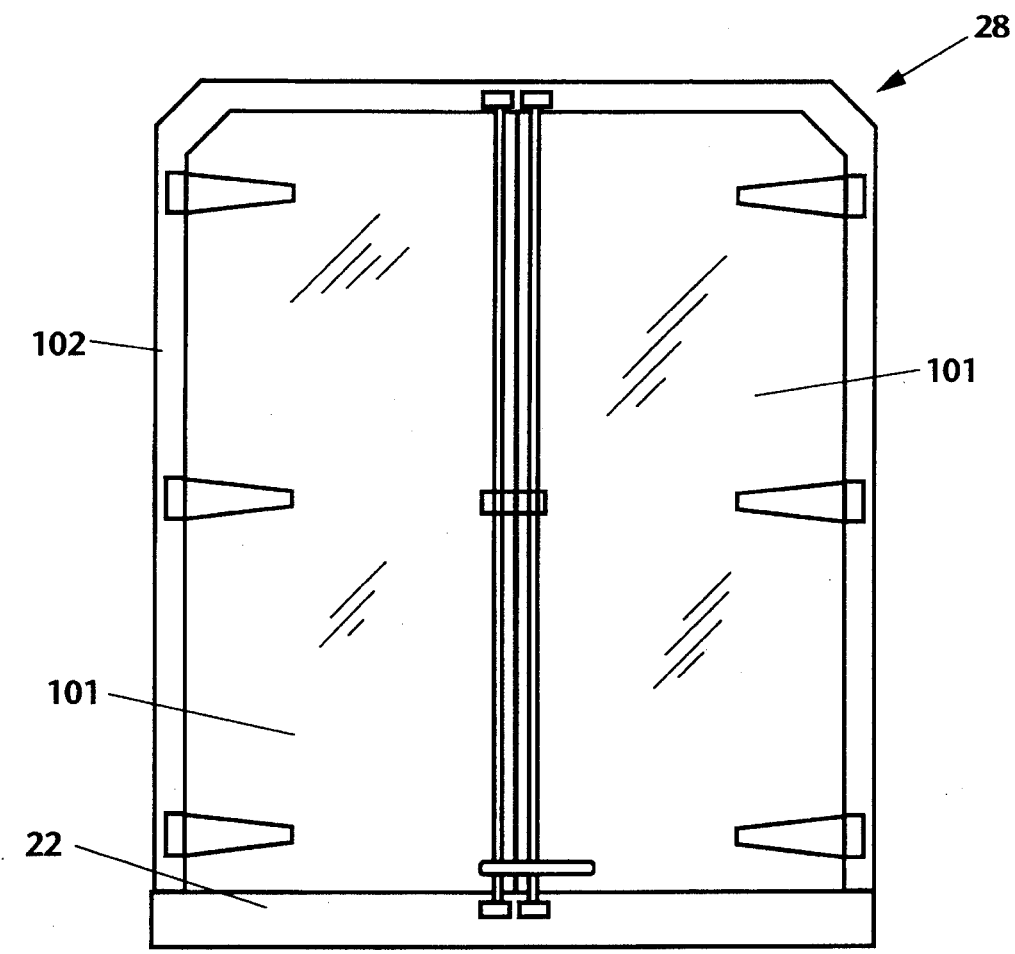
Figure_11

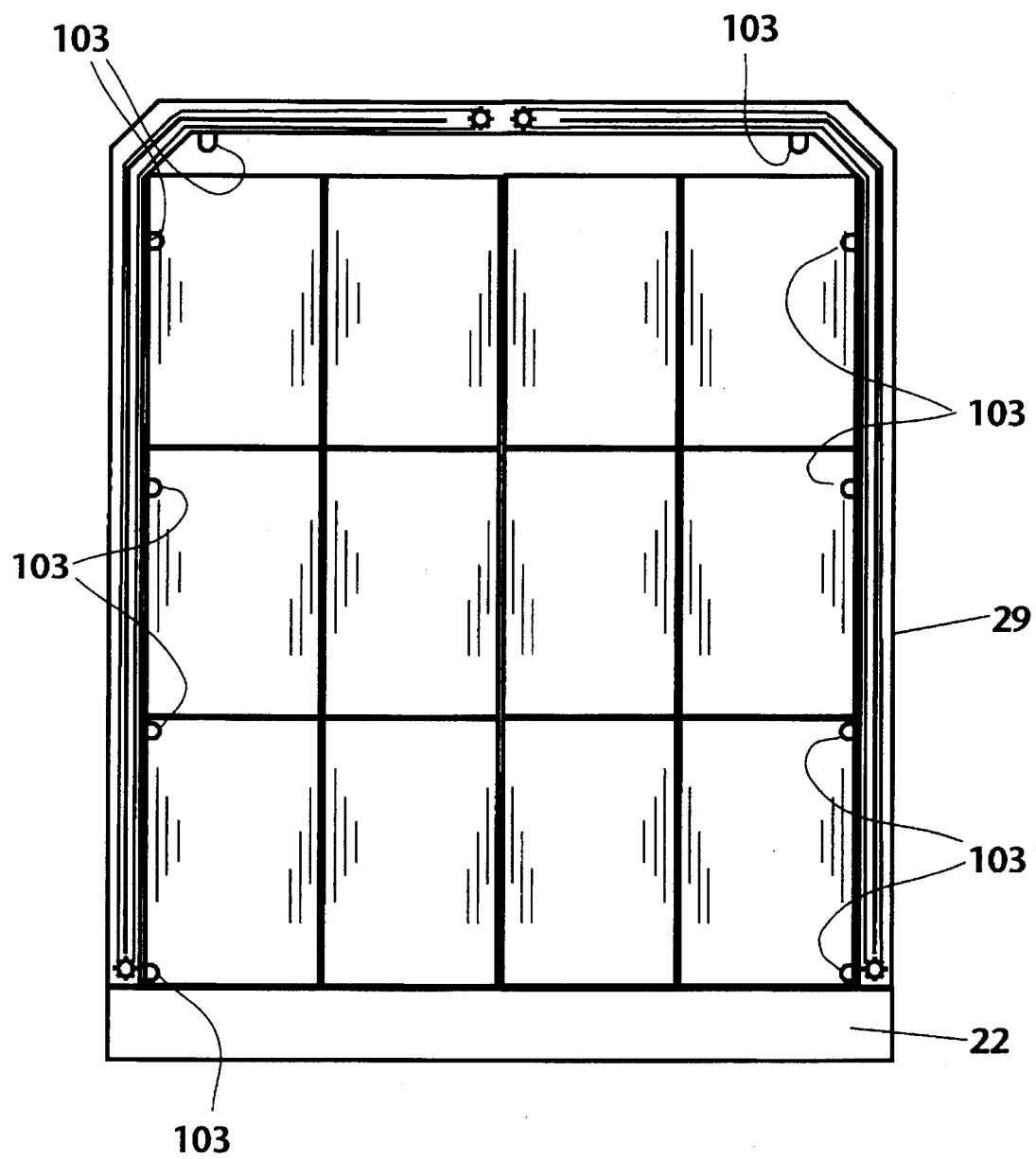
Figure_12

AUTOMATIC VEHICLE LOAD COVER

BACKGROUND OF THE INVENTION

This invention relates to freight load hauling on highway trailers, and more particularly to load covering arrangements for flatbed trailers.

Although a large amount of freight is containerized for trans-shipment via boat, rail, and highway, there is a great amount of freight that is shipped on flatbed trailers, in containers such as steel or plastic drums or barrels, pallet loads, custom packaging, or the like. These loads must be covered to prevent deterioration of the goods by the elements, protect the goods from vandals or thieves, and to provide safe vehicle operation.

There are known in the prior art many forms of load covering arrangements for flatbed trailers. In the simplest form, the loads are covered with tarps and tied down to cleats on the flatbed trailer. This approach requires a great deal of manual effort, and involves climbing up onto and down off of the flatbed trailer. Other more complex arrangements include tarp covers secured to a roller assembly extending above the trailer and aligned with the longitudinal axis thereof. The tarp covers may be supported by hoops or arches extending over the load area, or may include side edges received in channel guides. Conversely, some tarp covers rely on horizontally extending stays to define a shape for the tarp cover over the load area.

Roller mounted tarp covers suffer from drawbacks that have limited their utilization. There is no tarp fabric available that is sufficiently flexible and supple to be wrapped about a conveniently sized roller, yet strong enough to withstand extremely high wind exposure for prolonged periods, temperature extremes, prolonged wetting in hot and cold environments, and the like. Strengthening the fabric with stays creates a heavier tarp that requires a larger roller and roller driver.

A major drawback of roller mounted tarp covers is that although they provide positive retraction of the tarp cover, the roller assembly cannot by itself positively drive the tarp to unroll and extend outward and downward to enclose and cover the trailer. Rather, the unrolling action is created by manual traction applied to the lower edge of the tarp cover, aided by gravity. Thus physical effort is required to close the tarp cover, and operation is not automatic. Considering the long distances often spanned by tarp covers, one must be careful to pull the tarp cover straight down to avoid jamming the edges of the tarp on the channel guides (or the equivalent).

There is a need in the freight hauling industry for a retractable load cover for trailer-borne freight that requires minimal manual effort to retract or deploy, and which is strong, durable, and reliable.

SUMMARY OF THE INVENTION

The present invention generally comprises an automatic trailer load covering system. A significant feature of the load covering system is that it positively drives the tarp cover both to close and to open, thereby requiring virtually no manual effort to deploy or retract the tarp cover.

The load covering system includes a pair of end assemblies removably secured to opposite ends of the trailer load bed, and a main strut extends between the midpoints of the upper sides of the end assemblies. Each end assembly includes an arch-like channel that supports an end wall spanning the arch., the channels of the end assemblies being oriented in paired, opposed, confronting relationship. A pair of tarp covers are provided, each generally rectangular tarp cover including longitudinally opposed side edges received in one pair of the end channels. Each tarp cover extends from the main strut to the trailer bed, covering one side and one-half of the top of the trailer load bed.

A salient feature of the load covering system is the provision of a positive drive to both retract and close the tarp covers. A chain or cable drive includes a drive sprocket supported on the main strut at the upper inboard extent of the channel and an idler sprocket at the lower, outboard end of the channel, with a continuous loop of chain (or cable) extending through the channel. Each tarp cover is provided with a plurality of reinforcing stays extending longitudinally between front and rear edges of the tarp, The opposed ends of each stay are secured to a pair of slipper blocks that are slidably received within respective channels. Each slipper block includes a hole dimensioned to receive the chain therethrough in a frictional engagement, so that translation of the chain in the channel will drive the slipper block to translate in the channel until a travel limit is reached, after which the chain will slip through the slipper block. The ends of the lowermost stay are joined to a pair of connector blocks that are secured in the chain loop.

Each drive sprocket is joined to a drive shaft extending parallel to the main strut. A motor is coupled to each drive shaft through an endless chain loop, and a switch is provided to permit reversible operation. When the motor is actuated to raise a tarp cover, the two chains at opposite ends of the tarp are driven simultaneously by the same motor to raise the connector blocks toward the main strut. Thus the longitudinally opposed sides of the tarp cover are raised together at the same rate, so that the cover cannot become canted and caught in the channels. As the horizontal stays reach the upper limit of travel at the main strut, the chain slips through the respective connector blocks to raise the remainder of the tarp cover. The tarp cover becomes folded in accordion-like manner adjacent to the main strut, and the side of the trailer load bed is completely opened for loading and unloading operations.

An important feature of the automatic tarp cover is that it positively drives the tarp to close over the trailer bed. The drive motor is reversed, and the chains translating in the channels pull the connector blocks downwardly, unfolding the tarp cover and extending it over the top and side of the trailer bed. When the portion of the tarp between each slipper block and the main strut is pulled taught, that block reaches its limit of downward travel and stops, and the chain slides through that block to continue to drive the remaining slipper blocks toward closure.

Each side-opening tarp cover may be opened individually, or both may be opened simultaneously. In addition, for long trailer bed two tarp covers may be used to cover each side opening of the trailer bed. A medial support member is provided, with each tarp cover extending from a respective end of the trailer bed to the medial arch, and a separate drive mechanism for each tarp cover. Furthermore, a single motor may be connected to drive a pair of laterally opposed tarp cover assemblies through a gear or chain drive, reducing hardware cost while preserving all the functionality described above.

BRIEF DESCRIPTION OF THE DRAWING

FIG. 1 is a side elevation of the automatic load covering system of the present invention installed on a typical flatbed trailer.

FIG. 2 is a top view of the automatic load covering system as shown in FIG. 1.

FIG. 3 is a magnified, partially cross-sectioned side elevation showing the relationship of the drive chain, tarp cover, and channel of the load covering system.

FIG. 4 is a magnified, partially cross-sectioned end elevation showing the components depicted in FIG. 3.

FIG. 5 is a magnified, partially cross-sectioned plan view showing the relationship of the drive chain assembly, tarp cover, and channels of a further embodiment that includes a medial support assembly over the flatbed trailer.

FIG. 6 is an end elevation showing the chain drive assembly in relationship to a medial support assembly of the load covering system.

FIG. 7 is a plan view showing the chain drive assembly in relationship to a medial support assembly, as in FIG. 6.

FIG. 8 is a detailed top view depicting one embodiment of the motor drive system using two motors to drive individual tarp covers.

FIG. 9 is a detailed end view of the two motor drive assembly shown in FIG. 8.

FIG. 10 is a further embodiment of the motor drive system using one motor to drive a plurality of tarp covers.

FIG. 11 is an end elevation of one embodiment of the end assembly of the load covering system featuring end-opening doors.

FIG. 12 is an end elevation of a typical freight load disposed within the automatic load covering system.

DESCRIPTION OF THE PREFERRED EMBODIMENT

The present invention generally comprises a freight load covering system for use in conjunction with flatbed trailers and the like. Although the system will be described with reference to a highway trailer, it may be applied equally well to flatbed rail cars and the like.

With reference to FIGS. 1 and 2, a flatbed trailer 21 designed for freight hauling includes a generally rectangular load bed 22 supported by a rear wheel truck 23 and the rear wheel truck 24 of a tractor unit. The freight load covering system includes a front end assembly 27 extending upwardly from the forward end of the trailer bed 22, and a rear end assembly 28 extending upwardly from the rear end of the trailer bed 22. For long trailers a medial support assembly 29 may be provided, extending over the medial portion of the trailer bed 22. A main strut assembly 30 extends longitudinally above the load bed 22, joining the upper extents of the front and rear end assemblies and the medial support assembly 29 in a conjoint assembly.

A plurality of retractable load covers 31a–31d are provided each extending longitudinally from a respective front or rear end assembly to the medial support 29. (For shorter trailers on which no medial support is required, each retractable cover may span the distance between the front and rear end assemblies.) The retractable covers are secured at an upper, inboard edge to the main strut assembly 30, and the lower, outboard edge is retractable to expose the freight load 32. For example, the load cover 31d is depicted in FIGS. 1 and 2 as partially retracted to gain access to a load of stacked drums.

With regard to FIGS. 3–5, each retractable load cover 31 generally comprises a rectangular tarp formed of flexible, durable material such as reinforced Nylon or the like. A plurality of horizontally extending tubular pockets 32 are formed in each tarp in spaced apart, parallel relationship. A tubular stay 33 extends through each pocket 32 and protrudes from each end thereof. The stays 33 strengthen the tarp across its longitudinal span, and also define the placement of the accordion folds that permit the tarp to retract.

Each end assembly includes a dual channel assembly 34. Parallel panels 36 and 37 extend orthogonally from end panel 39 to define a deep channel therebetween, and parallel panel 38 defines a shallow channel 42 with opposed panel 37. The channel 41 is adapted to receive and retain a vertically extending edge portion 43 of the tarp cover 31 in slidable fashion. The channels 41 and 42 extend continuously from the load bed 22 to the main strut assembly 30. An endless loop 44 of chain or wire rope is arranged so that a drive leg 46 of the loop is disposed within channel 41 and the return leg 47 of the loop 44 is disposed in channel 42. (The invention will be described with reference to a chain loop, but a wire rope loop is considered equivalent.) The panel 37 is foreshortened at its lower end, and an idler sprocket wheel 48 is disposed medially of the two channels 41 and 42 at the bottom ends thereof to permit circulation of the chain loop 44 in the two channels.

The end of each stay 33 extends from its respective pocket 32, and is secured to the chain loop 44. Adjacent to the lower edge 50 of the tarp cover, the lowermost stay 32' is joined at its opposed ends to a connector block 51, as shown in FIGS. 3 and 4. The connector block is joined in the chain leg 46 to translate in the channel 41 and to move the stay 32' and the lower edge 50 of the tarp cover therewith. The connector block includes a wear plate 55 to impinge on the surface of the panel 37 in low friction, sliding fashion. It may be appreciated that the chain leg 46 provides pulling force both upwardly and downwardly to drive the lower edge of the tarp cover to raise and open, and descend and close.

The remaining plurality of stays 33 are joined at each of their opposed ends to a slipper block 52, as shown in FIG. 5. Each slipper block includes a bore 53 extending therethrough, the bore 53 being dimensioned to receive the chain therethrough in frictional engagement. The frictional engagement permits the slipper block (and thus the connected stay 33 and the related portion of the tarp cover) to translate with the chain leg 46 until the stay impinges on an immovable object; thereafter, the chain slips through the bore 53 while the slipper block remains generally stationary.

Thus when the tarp cover is in its closed position with the edge 50 adjacent to the load bed 22, initial upward translation of the chain leg 46 in the channel 41 drives the connector block and all the slipper blocks upwardly toward the main strut. As the slipper blocks of the uppermost stay reach their upper limit of travel in the channel 41, those slipper blocks are stopped while the chain slips through those blocks and continues to raise the remainder of the tarp cover. The slipper blocks of the next adjacent stay are raised until they impinge on the stationary blocks of the uppermost stay, and the adjacent stay likewise is stopped while the chain continues. This process is reiterated, causing the tarp cover to assume an accordion-like folded condition adjacent to the main strut, until the connector blocks of the lowermost stay are translated to a position in the channel 41 where they are blocked by the stationary slipper blocks. At this point the chain translation is stopped and the tarp cover is fully open.

The process for closing the tarp cover comprises translating the chain leg 46 downwardly, thereby translating the connector block and all the slipper blocks downwardly in the channel 41. As the uppermost stay reaches a position where the tarp cover portion extending from the uppermost stay to the main strut becomes tensioned, the slipper blocks of the uppermost stay stall in the channel 41 while translation of the chain leg continues. The stay adjacent to the uppermost stay then translates downwardly until it stalls, and this process is reiterated until the connector block translates to its lowermost position and the lower edge of the tarp is adjacent to the load bed 22. The chain translation is then stopped, and the tarp cover is fully closed.

It should be noted that the channel configuration of each end assembly is a mirror image of the confronting channel assembly, as suggested in FIG. 5. The confronting channel configuration may be embodied in the medial support assembly 29, if provided, or in the opposed end assembly where no medial arch is required.

With regard to FIG. 6, it may be noted that the channels 41 and 42 are provided with wear pads 61 and 62, respectively, at the oblique sections where the channels traverse from vertical travel to horizontal travel. The wear pads, which may be formed of UHMW (ultra-high molecular weight) polymer to provide lubricity and wear resistance, span the oblique sections on the surfaces of the panels 37 and 38 that are contacted by the translating chain, connector blocks, and slipper blocks.

Referring to FIG. 7, one embodiment of the motor system for the chain drives includes a pair of electric motors 63 and 64 secured to mounting plates 66 and 67, respectively, that are welded or otherwise joined to the main strut 30. The motor 63 is coupled to a chain drive 68 that transfers rotational motion to a longitudinally extending drive shaft 69. The drive shaft 69 extends the length of the main strut, and is supported thereby. A pair of medial chain drive sprocket wheels 71 and 72 are secured to the middle portion of the shaft 69 adjacent to the medial support to engage the chain loops 44c and 44d that operate the tarp covers 31c and 31d, respectively. Another pair of drive sprockets (not shown in FIG. 7) is secured to the opposed ends of the shaft 69 to operate the related chain loops disposed at the end assemblies 27 and 28.

Likewise, motor 64 is connected through chain drive 73 to longitudinally extending drive shaft 74, which is also supported by the main strut 30. Secured to the shaft 74 adjacent to the medial support 29 is a pair of drive sprockets 76 and 77 to engage and drive the chain loops 44a and 44b that operate the tarp covers 31a and 31b. Another pair of drive sprockets (not shown in FIG. 7) is secured to the opposed ends of the shaft 74 to operate the related chain loops disposed at the end assemblies 27 and 28. Thus in this embodiment one motor 63 drives the chain loops to open and close both tarp covers 31c and 31d, and the other motor 64 operates the tarp covers 31a and 31b.

With reference to FIGS. 8 and 9, another embodiment of the motor system for the chain drive includes a pair of electric motors 81 secured to the main strut assembly 30 adjacent to one end thereof. A pair of drive shafts 83 extends longitudinally parallel to the main strut assembly 30 and supported thereby. Each motor is coupled through a respective chain drive 82 to one of the shafts 83. A plurality of drive sprockets 84 are secured to each shaft 83, one pair of drive sprockets for each tarp cover, with each drive sprocket 84 engaging and driving a chain loop 44.

A further embodiment of the motor system, shown in FIG. 10, relies on a single electric motor 91 to drive a plurality of tarp covers on both sides of the truck bed. Drive shafts 83' are supported by the main strut assembly 30, similar to the structure of FIG. 9, with a plurality of drive sprockets 84 supported on the shafts 83' to engage and drive a plurality of chain loops 44. A drive gear 92 is secured to the output shaft of the motor 91 in axially translatable fashion, and each shaft 83' is provided with a spur gear 93. A solenoid operated shift mechanism 94 is provided to translate the drive gear 92 axially into and out of engagement with the spur gears 84, whereby the motor is connected to drive the tarp covers associated the chain loops 44. Thus one motor may be employed to operate one or more bilateral pairs of tarp covers.

The rear end assembly 28 of the automatic tarp cover may be a fixed panel wall. Alternatively, as shown in FIG. 11, the end assembly 28 may include a pair of doors 101 joined to a frame 102 by hinges. The doors 101 may be opened to gain access to the freight load without opening the tarp covers at the sides of the trailer. This feature may be important in situations where the trailer must be backed up to a loading dock to load and unload the freight.

With regard to FIG. 12, a typical freight load carried within the tarp cover assembly may comprise a plurality of standard drums (e.g., 55 gallon capacity) stacked in rows across the load bed 22. The front and rear assemblies and the medial support 29 may be provided with tiedown eyes 103 to secure ropes, webbing, and/or netting to hold the load in place and prevent shifting. It may be appreciated that any freight load, such as palletized articles, machinery, stacked goods, and the like may be carried within the automatic tarp cover of the invention.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. For example, the invention is applicable to flatbed rail cars, luggage hauling carts for airline use, specialized freight vehicles involved in manufacturing, and the like. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

We claim:

1. An automatic load covering system for a transportable load bed, including;

at least one tarp cover disposed to extend over and cover a portion of the transportable load bed, said tarp cover including opposed side edges, an upper edge, and a lower edge;

a pair of spaced apart channel assemblies associated with each tarp cover, each channel assembly including a first channel dimensioned to receive one of said side edges of said tarp cover in freely translating fashion, said first channel extending upwardly from said load bed;

each channel assembly including an endless loop web having a drive portion extending through said first channel, and motor means for translating said endless loop web in reversible fashion;

means for securing each of said side edges of said tarp cover to said drive portion of said endless loop drive web to translate said tarp cover edges reversibly in said pair of channel assemblies, whereby said tarp cover may be raised and lowered with respect to said load bed;

said means for securing said side edges of said tarp cover including a plurality of stays extending generally horizontally and secured to said tarp cover in spaced apart relationship, each of said stays having opposed ends extending laterally outwardly from said tarp cover;

means for joining said opposed ends of said stays to a respective one of said drive portions of said endless loop webs, including a plurality of slipper blocks, each secured to a respective opposed end of one of said plurality of stays, each slipper block including means to frictionally engage said respective drive portion of said endless loop webs to translate said plurality of stays simultaneously; and, said plurality of stays includes a lowermost stay disposed adjacent to said lower edge of said tarp cover, and means for connecting each of said opposed ends of said lowermost stay to said respective drive portion of said endless loop webs.

2. The automatic load covering system of claim 1, wherein each of said pair of channel assemblies includes a second channel extending contiguously to said first channel, said endless loop web including a return leg extending through said second channel, whereby said endless loop web extends continuously in said first and second channels.

3. The automatic load covering system of claim 2, wherein each of said pair of channel assemblies includes a lower end adjacent to said load bed, and further including an idler wheel secured to each of said channel assemblies and disposed intermediate of said first and second channels, said endless loop web passing about said idler wheel, said idler wheel demarcating said drive portion and return portion of said endless loop web.

4. The automatic load covering system of claim 3, wherein said endless loop web comprises a drive chain, and said idler wheel comprises a sprocket wheel.

5. The automatic load covering system of claim 4, wherein each of said pair of channel assemblies includes an upper end disposed above the load bed, and further including a drive sprocket disposed at said upper end of each channel assembly, said drive sprocket engaging said drive chain, and means for coupling said drive sprocket to said motor means.

6. The automatic load covering system of claim 1, wherein said means to frictionally engage includes a bore extending through each slipper block, said drive portion of one of said endless loop webs extending through said bore, said bore dimensioned to frictionally engage said drive portion.

7. The automatic load covering system of claim 6, further including a main strut extending above the load bed and joining said pair of channel assemblies, said upper edge of said tarp cover secured fixedly to said main strut.

8. An automatic freight covering system for a trailer load bed having front and rear ends and a lateral extent, including;

a front end assembly extending upwardly from the front end of the load bed and spanning substantially all of the lateral extent thereof;

a rear end assembly extending upwardly from the rear end of the load bed and spanning substantially all of the lateral extent thereof;

a main strut extending medially with respect to the lateral extent of the load bed and joining upper portions of said front and rear end assemblies;

a plurality of tarp covers, each having an upper edge, a lower edge, and opposed side edges, said upper edge of each tarp cover joined fixedly to said main strut, said lower edge of each tarp cover extendable to said load bed, said tarp covers being disposed contiguously, whereby said tarp covers, said load bed, and said front and rear end assemblies conjointly enclosing a load space above said load bed;

a plurality of paired channel assemblies supported by said front and rear end assemblies, each pair of channel assemblies being disposed in confronting, spaced apart relationship with one of said tarp covers supported therebetween;

each channel assembly including a first channel extending from said main strut to said load bed, said first channel being dimensioned to receive one of said side edges of one of said tarp covers in freely translating fashion, whereby each tarp cover is slidably supported by a pair of said channel assemblies and extendable from an open, folded disposition adjacent to said main strut to a closed disposition in which said lower edge impinges on said load bed;

motor means for driving each tarp cover reversibly from said open disposition to said closed disposition;

a plurality of endless loop webs, each having a drive portion extending through a respective one of said first channels and translatable by said motor means, and means for securing each of said side edges of said tarp cover to said drive portion of said endless loop drive web to translate said tarp cover edges reversibly in said pair of channel assemblies;

a plurality of stays extending generally horizontally and secured to each tarp cover in vertically spaced relationship, each of said stays having opposed ends extending laterally outwardly from said tarp cover;

means for joining said opposed ends of said stays to said endless loop webs of said pair of channel assemblies.

a plurality of slipper blocks, each secured to one end of one of said plurality of stays, each slipper block including means to frictionally engage said respective endless loop web of a respective adjacent channel assembly to translate said plurality of stays simultaneously; and, said plurality of stays including a lowermost stay disposed adjacent to said lower edge of each tarp cover, and means for connecting each opposed end of said lowermost stay in said respective endless loop web of a respective adjacent channel assembly.

9. The automatic load covering system of claim 8, wherein said means to frictionally engage includes a bore extending through each slipper block, said endless loop web extending through said bore, said bore dimensioned to frictionally engage said endless loop web.

10. The automatic load covering system of claim 8, wherein said motor means includes a drive shaft extending longitudinally and supported by said main strut, a plurality of drive wheels secured to said drive shaft and spaced apart therealong, each adapted to engage one of said endless loop webs for reversible translation thereof.

11. The automatic load covering system of claim 10, further including a plurality of idler wheels, each disposed at a lower end of one of said first channels and adapted to engage one of said endless loop webs for circulation thereof between each idler wheel and an associated drive wheel.

12. The automatic load covering system of claim 11, further including means for driving a plurality of said drive shafts by a single motor.

13. The automatic load covering system of claim 8, further including a medial support assembly disposed intermediate of said front and rear end assemblies and extending over said load bed in an arch-like configuration, said medial support assembly including a plurality of said channel assemblies, each of said tarp covers extending from said medial support assembly to either said front or rear end assemblies.

* * * * *